United States Patent [19]

Swinderman

[11] Patent Number: 4,874,082
[45] Date of Patent: Oct. 17, 1989

[54] CONVEYOR SKIRT BOARD, CLAMP AND MOUNTING ARRANGEMENT

[75] Inventor: Robert T. Swinderman, Kewanee, Ill.

[73] Assignee: Martin Engineering Company, Neponset, Ill.

[21] Appl. No.: 257,504

[22] Filed: Oct. 14, 1988

[51] Int. Cl.$^4$ .............................................. B65G 21/20
[52] U.S. Cl. ..................................... 198/836; 222/286
[58] Field of Search ............... 198/525, 530, 532, 540, 198/547, 550.01, 550.02, 550.13, 836; 222/163, 285, 286

[56] References Cited

U.S. PATENT DOCUMENTS

| | | | |
|---|---|---|---|
| 2,593,610 | 4/1952 | Roberts | 198/836 X |
| 3,499,523 | 3/1970 | Clegg | 198/836 |
| 4,236,628 | 12/1980 | Stahura | 198/836 X |

FOREIGN PATENT DOCUMENTS

| | | |
|---|---|---|
| 1931845 | 1/1971 | Fed. Rep. of Germany . |
| 2416963 | 4/1974 | Fed. Rep. of Germany . |
| 2418458 | 10/1975 | Fed. Rep. of Germany ...... 198/836 |
| 1256691 | 12/1971 | United Kingdom . |
| 1378509 | 12/1974 | United Kingdom . |

Primary Examiner—Robert J. Spar
Assistant Examiner—Lyle Kimms
Attorney, Agent, or Firm—Lee, Mann, Smith, McWilliams & Sweeney

[57] ABSTRACT

A skirt board and mounting arrangement to seal the side edges of a conveyor belt to prevent the escape of material being conveyed. The skirt board sections include a pair of opposed side faces, one of which is placed against a mounting surface. One of the faces includes a specially constructed engagement surface which is operative, when engaged by a stop to permit the skirt board to be adjusted downwardly toward the conveyor belt but prevents the skirt board from moving upwardly away from the belt. A clamp secures the skirt board against a mounting surface.

14 Claims, 2 Drawing Sheets

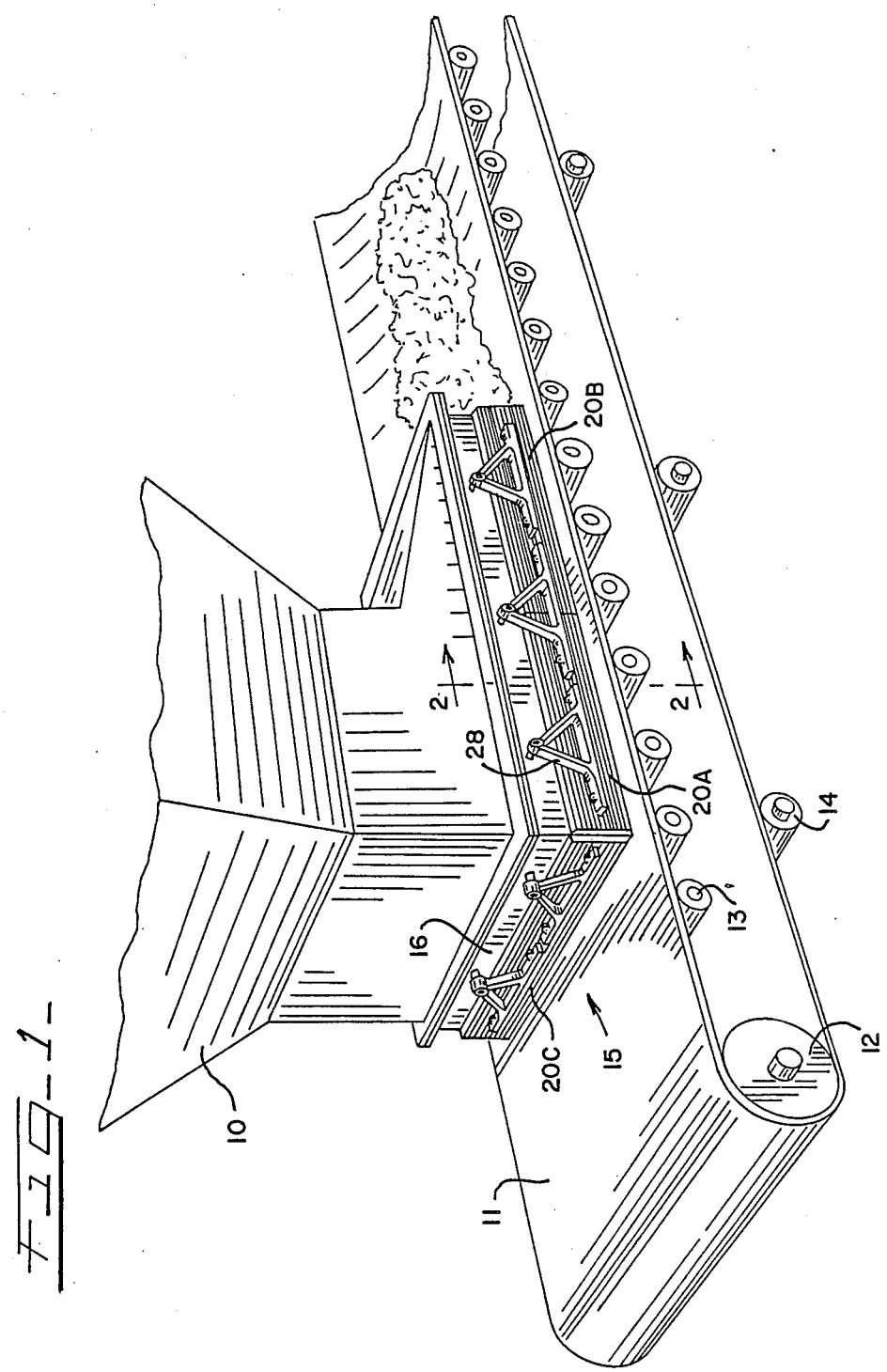

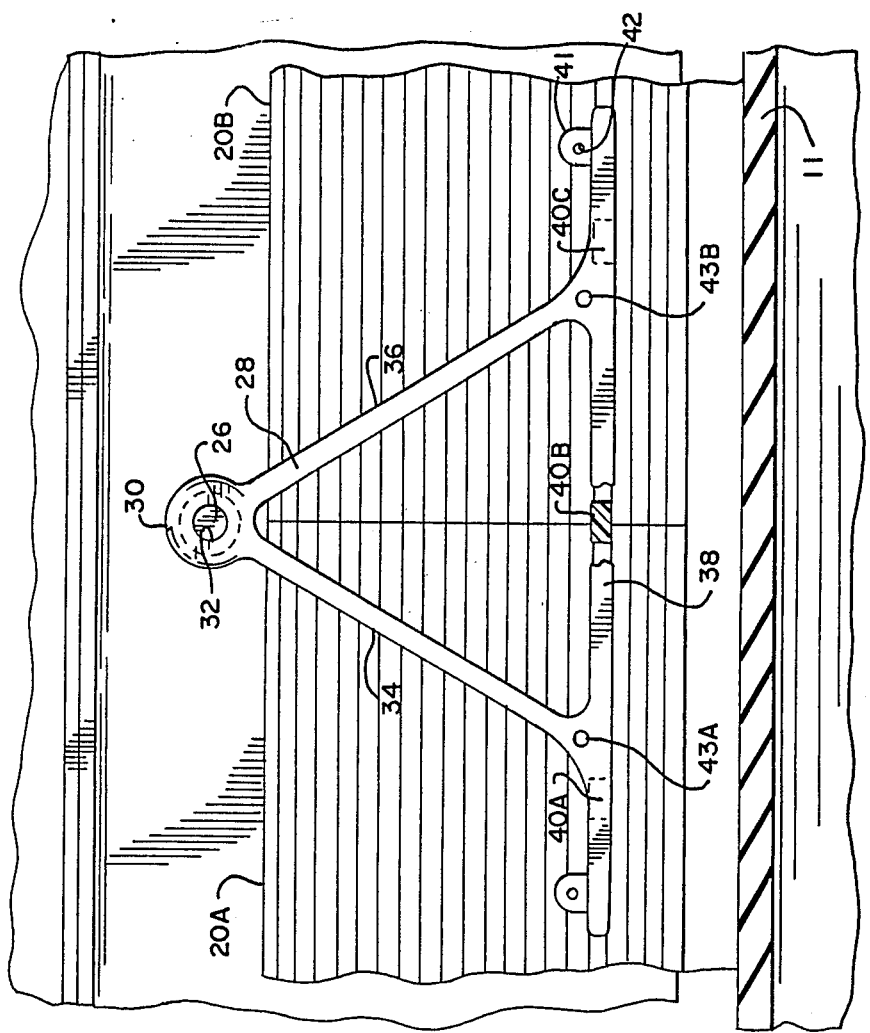
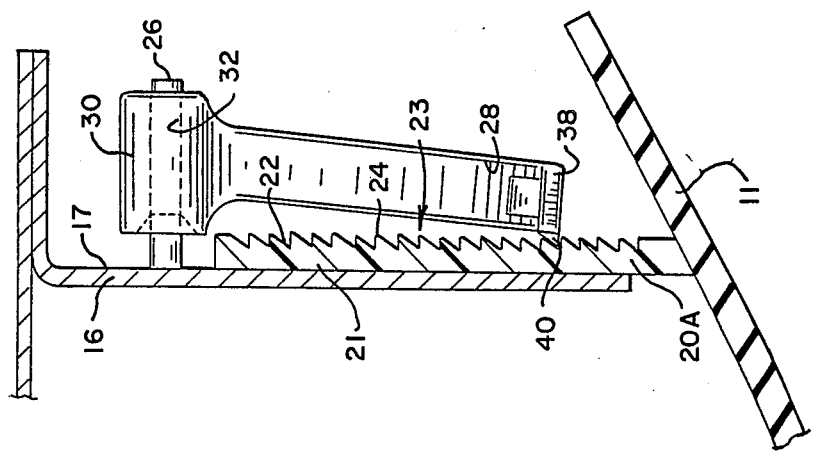

CONVEYOR SKIRT BOARD, CLAMP AND MOUNTING ARRANGEMENT

BACKGROUND OF THE INVENTION

It has been the general practice to utilize skirt boarding on conveyors to provide a seal between the moving conveyor belt and the stationary bin, or chute, where material is discharged onto the belt. This point is important to seal because it is here that a great percentage of the dirt encountered throughout a plant finds its source. Skirting has also been utilized along edges of a conveyor belt unrelated to a hopper. Material escaping from the conveyor becomes scattered throughout the plant and represents a loss of the material conveyed as well as a safety hazard.

Prior skirt boards were constructed from resilient material, such as rubber or the like, and were mounted by some means which afforded manual adjustment, in an effort to mate the board with the conveyor belt in some such manner as might form an adequate sealing relationship. The seal was difficult to maintain because of the wear on the lower edge of the skirt board resulting from the abrasion by the constantly traveling conveyor belt which made the frequent adjustments required, almost impossible for maintenance personnel in the plant to cope with. Unless the adjustment was attended to at regular intervals it was not possible to prevent the material from escaping from the conveyor system.

Conventional skirt board installations heretofore have provided arrangements where it was possible to adjust the skirt boards to obtain a sealing engagement with the conveyor belt but generally, these prior skirt boards were bolted in place and it became a major operation to perform the adjustments. The system had to be completely shutdown, the bolts loosened, the skirt boards adjusted and then the bolts retightened. This operation ha to be repeated frequently.

Various camming arrangements have also been used in which an overcenter toggle mechanism secures the skirt against a backing plate. When adjustment is required the toggles are loosened, the skirt sections lowered and the toggle reclamped. See for example the arrangements illustrated in U.S. Pat. Nos. 2,593,610 and 3,499,523, British Pat. Nos. 1,256,691 and 1,378,509 and West German Pat. Nos. 1,931,845 and 2,416,963. In systems such as these which utilize moving parts for adjustment the parts soon become inoperative due to corrosion and the build up of material. Often the skirt board operates in highly contaminated environments. If the skirt sections are clamped with insufficient force the belt can force the skirt board upwardly opening the leak and allowing material to escape. In order to prevent upward movement a high clamping force was required but such a force prevented any downward adjustment of the skirt board.

The assignee of the present application developed a skirt board and mounting arrangement for interlocking skirt board sections which utilized, in one embodiment, vertical slides on a mounting plate mating with grooves in a skirt board and arranged to facilitate movement of the skirt board sections in a downward direction but to resist upward movement. This arrangement is illustrated in U.S. Pat. No. 4,236,628 reissued as Re No. 31,249.

None of the prior art arrangements incorporate the features of the present invention.

SUMMARY OF THE INVENTION

The present invention provides a skirt board structure, a clamp and a mounting arrangement which is simple and inexpensive to adjust. It is effective to secure a skirt board section against a mounting surface with substantially reduced force so as to allow downward adjustment of the skirt section toward the conveyor belt but retard movement of the skirt away from the belt. This is accomplished by providing a skirt board which has a face on which is formed a specially constructed engagement surface which is effective, when engaged by a clamp, to permit downward adjustment of the skirt board toward the conveyor belt without the use of tools or complicated locking and release mechanisms but to retard movement of the skirt board away from the belt.

BRIEF DESCRIPTION OF THE DRAWINGS

FIG. 1 is a general perspective view of a conveyor belt passing under a loading chute showing the skirt board and installation of the present invention.

FIG. 2 is a cross-sectional view taken along the line 2—2 of FIG. 1 showing the skirt board, clamp and mounting installation of the present invention.

FIG. 3 is a side view of the skirt board, clamp and mounting arrangement shown in FIG. 2.

DETAILED DESCRIPTION OF THE INVENTION

As shown in FIG. 1, a chute 10 is mounted to discharge its contents onto a traveling conveyor belt 11. The conveyor belt runs on rollers 12 located respectively at opposite ends of its reach. The conveyor belt surface is supported by idler rollers 13 which carry the conveying surface in a trough-like shape by reason of the inclined disposition of the side rollers relative to the bottom center roller. Rollers 14, at spaced intervals, support the underside of the conveyor belt system.

The chute 10 of FIG. 1 discharges directly onto the conveyor belt 11. In order to prevent the escape of any conveyed material at the side or rear edges of the chute, a skirt board installation 15 is mounted at the rear of and along the side edges of the chute 10. To seal these areas against the escape of material deposited on the belt, the skirt board installation includes a mounting plate 16 either secured on the face of, or forming a part of, the side wall of the chute 10. Other skirt board arrangements consist of free standing mounting plates mounted above or below conveyor belts.

The mounting plate 16 defines, in the preferred embodiment shown in FIG. 2, a substantially flat outer face 17 extending parallel with the side wall of the chute 10 and generally perpendicular to the plane of the central portion of the conveyor belt. A plurality of skirt board sections, shown in FIG. 1 as 20A and 20B are shown mounted on the side of the chute 10. An additional skirt section 20C is mounted on the rear face of the chute 10.

Each skirt section 20 includes a pair of opposed faces 21 and 22. In the embodiment shown in FIG. 2, the face 21 is smooth and flat and abuttingly engages the outer surface 17 of the mounting plate 16. The opposite face 22 includes a specially constructed engagement surface 23, shown in this embodiment as a plurality of teeth 24, inclined upwardly at an angle to the mounting plate 16 and arranged linearly in rows spaced vertically from each other. Any of a number of other configurations of engagement surface 22 may be utilized to accomplish the results of the present invention. The skirt sections 20 are formed of rubber or plastic and are approximately one-half inch thick by six inches in height. A rubber skirt board of approximately fifty durometer is preferred. They are generally supplied in lengths of twenty-five feet and can be cut to length for individual installations. The engagement surface 23 of the preferred embodiment consists of a stair-step pattern with the steps being roughly spaced three-sixteenths of an inch from each other. Extending from the mounting plate 16 is a stud 26 which can be of conventional construction, for example, one-half - thirteen. The stud is preferably threaded but may be furnished without threads.

In order to secure the skirt board sections 20 against the mounting plate 16, clamps 28 are mounted on studs 26. Each clamp 28 includes a circular mounting boss 30 which defines an aperture 32 extending through its center. Extending from the boss 30 are a pair of angularly diverging legs 34, 36. A clamping bar 38 forms the base or third leg of a triangle and extends outwardly beyond the legs 34 and 36. Three teeth, shown in FIG. 3 as 40A, 40B and 40C extend inwardly from the bar 38 to form a stop. As shown in FIG. 2, the teeth 40 are sized so as to engage grooves defined between adjacent teeth 24 of skirt board sections 20. If several short teeth are used the clamp can easily span across rows of teeth in the engagement surface allowing for adjustment to match the curvilinear path that the belt may follow. Alternatively, the clamping bar 38 can be formed with a stop mechanism consisting of a single tooth 40 extending the entire width of the bar 38.

The clamp 28 may be formed of any suitable resilient material including plastic or rubber. The preferred embodiment of the clamp is a fiberglass and plastic composite consisting of high density polyethylene with approximately ten percent glass fiber. In order to insure the resiliency of the clamp the legs 34 and 36 and the clamping bar 38 have a wall thickness of approximately ten millimeters. The clamping bar 38 has a length of approximately three hundred millimeters. Each of the side legs has a length of approximately one hundred fifty millimeters from the mounting boss 30 to the clamping bar 38. The clamping bar, and each side leg has a lateral width of approximately twenty-five millimeters. Such a clamp is lightweight, inexpensive, corrosion-resistant and provides sufficient resilience to function in the manner as will be described.

The clamp 28 is supported on the stud 26 extending through the central aperture 32 formed in boss 30. If additional pressure is required a nut or other force applying fastener can be threaded on the end of stud 26, exterior of the boss 30 to force the clamp against the skirt board. In typical embodiments, the studs 26 may be mounted on twelve inch or twenty-four inch centers along the mounting plates 16. The aperture 32 is sized so as to provide an interference fit with the stud 26.

As best shown in FIG. 3, extending upwardly at each end of each bar 38 is a boss 41 with a central aperture 42 formed therein. The boss 41 can be used to tie adjacent clamps 28 together to prevent twisting in the direction of belt movement. Typically this is accomplished using nylon cable tie or the like. In severe applications, the first clamp can be anchored to the mounting plate and adjacent clamps tied to each other. Also illustrated in FIG. 3 are apertures 43A and 43B formed in the clamping bar 38. If additional clamping force is needed, pointed metal inserts or screws (not shown) could be inserted into the apertures 43A and 43B. Such an arrangement could be utilized in an extremely rugged installation where additional holding power is required.

The operation of the preferred embodiment of the skirt board and mounting arrangement of the present invention is as follows. When skirt board is to be installed on the side walls of a conveyor chute or alternatively on a mounting plate disposed above or below the conveyor belt 11, an appropriate number of skirt board sections 20 are arranged such that one side face 21 engages the outer surface 17 of the mounting plate 16. The ends of each skirt section 20 abut a corresponding end of the adjacent skirt board section. The skirt board sections 20 are positioned so that the lower edge engages the surface of the conveyor belt 11. In order to secure the skirt sections in this position, clamps 28 are installed by pounding the boss 30 over stud 26 until teeth 40, extending from leg 38, engage the groove formed between adjacent teeth 24 as shown in FIG. 2. The skirt board sections 20 are thus forced against the surface 17 of mounting plate 16 and the stop 40 engages the specially constructed engagement surface 23.

When wear has occurred at the lower edge of the skirt board 20 so as to require downward adjustment, force is applied to the upper edge of the skirt sections between adjacent clamps. Striking the skirts with a hammer or rubber mallet is sufficient.

By virtue of the ratchet relationship between the engagement surface 23 and the teeth 40, individual skirt sections 20 can be incrementally adjusted downwardly until the lower edge again engages the conveyor belt 11 with sufficient force to effect sealing of the side surfaces of the belt. By virtue of the design of the engagement surface 23 and the teeth 40, upward travel of the conveyor skirt 20 relative to the conveyor belt 11 or mounting plate 16, is prevented. Such an arrangement greatly facilitates adjustment of conveyor skirt sections downwardly as wear between the skirt and conveyor belt takes place so as to maximize the sealing function of the skirt board sections. Adjustment can be accomplished simply and without substantial effort by the conveyor belt operator without requiring shut down of the conveyor belt or an extensive unclamping, adjustment and reclamping as was generally necessitated in prior art arrangements. The high clamping forces of the prior art arrangements have been substantially reduced.

It must be understood that any of a variety of engagement surfaces 23 can be formed on a surface of the conveyor skirt section 20 so as to accomplish the result intended in the present invention.

It is also contemplated that the engagement surface 23 could be formed on the face of the skirt section 20 which engages the surface 17 of the mounting plate 16. For example, if the skirt 20A shown in FIG. 2 were reversed such that the engagement surface 23 contacted the surface 17, a tooth or other stop mechanism (not shown) could be provided extending outwardly from the lower edge of the mounting plate 16 to contact the engagement surface 23.

Another possible arrangement would be for the mounting plate 16 to be angled toward the center of the conveyor belt and the engagement surface 23 to simply co-act with the lower edge of the mounting plate 16. As can be readily understood, a wide variety of modifications of the present invention could be designed which accomplish a similar result.

One important feature of the present arrangement is the provision of an engagement surface on the skirt board construction itself. Such a feature in combination with a clamping force exerted by a clamp member and a stop designed to contact the engagement surface provides an arrangement in which individual skirt sections can be easily adjusted to maintain contact with the conveyor belt without the need for extensive adjustment procedures. This allows the conveyor operator to continuously adjust the skirt board along the belt, without shutdown, and without assistance from maintenance personnel.

Another important feature of the invention is the provision of a resilient clamp for adjustably mounting the skirt board adjacent a mounting surface. The clamp disclosed herein is capable of operating with skirt board having a specially constructed engagement surface or, in some instances, with skirt board which is flat on both side faces. The flexibility of the clamp provides several advantages over prior art arrangements. Problems are presented in skirt board installations when a splice passes over a conveyor idler. The splice being thicker than the conveyor belt tends to move the skirt board up away from sealing engagement with the belt. In the present arrangement due to the flexibility of the clamp and the skirt board, the clamp stays engaged with the skirt board in its sealing position and absorbs some of the displacement caused by the splice travel. Displacement of skirt board in prior art arrangements can also be caused by objects becoming lodged between the belt and skirting or where ice or dirt build up on conveyor idlers. The flexing of the present arrangement overcomes such obstacles. The reduction in force over prior art devices to effect clamping allows easy adjustment and prevents belt damage.

Various features of this invention have been particularly shown and described in connection with the illustrated embodiment of the invention. However, it must be understood that these particular arrangements merely illustrate and that the invention is to be given its fullest interpretation within the terms of the appended claims.

What is claimed is:

1. A skirt board mountable adjacent a mounting plate to contact a conveyor belt and seal against the escape of conveyed material, said skirt board including a pair of opposed side faces, at least one of which is formed so as to define a specially constructed engagement surface which includes a plurality of grooves oriented to define a ratchet surface and adapted when contacted by a stop means having a projection, to permit movement of said skirt board toward said conveyor belt but to retard movement of said skirt board away from said belt.

2. A skirt board as in claim 1 in which said specially constructed engagement surface includes a plurality of teeth oriented to cooperate with said stop means for one-way movement of said skirt board.

3. A skirt board as in claim 2 in which said teeth are arranged in linearly extending rows, spaced vertically from each other, said teeth inclined upwardly at an angle to the vertical axis of said skirt board.

4. A skirt board installation to seal the sides of a moving conveyor belt to prevent the escape of conveyed material including a mounting plate; at least one skirt board mountable adjacent said mounting plate to contact said conveyor belt said skirt board including a pair of opposed side faces, at least one of which is formed so as to define a specially constructed engagement surface which includes a plurality of grooves oriented to define a ratchet surface; a clamp engageable with said skirt board effective to exert a force urging said skirt board into contact with said mounting plate, said clamp including stop means having a projection adapted to contact said ratchet surface so as to permit movement of said skirt board toward said conveyor belt but to retard movement of said skirt board away from said belt.

5. A skirt board installation as in claim 4 including a pin member extending from said mounting plate and said clamp mountable on said pin member.

6. A skirt board installation as in claim 4 in which said specially constructed engagement surface includes a plurality of teeth oriented to cooperate with said stop means for one-way movement of said skirt board.

7. A skirt board installation as in claim 6 in which said teeth are arranged in linearly extending rows spaced vertically from each other, said teeth inclined upwardly at an angle to the vertical axis of said skirt board.

8. A skirt board installation as in claim 4 in which said clamp includes securement means adapted for securement of adjacent clamps together to prevent twisting in the direction of belt movement.

9. A clamp for adjustably mounting skirt board adjacent a mounting surface including a clamping bar laterally extending in the direction of conveyor belt travel; stop means including a projection extending from said clamping bar; mounting means including a mounting hub defining an aperture therethrough spaced vertically from said clamping bar adapted to support said clamp adjacent said mounting surface; at least one leg connecting said clamping bar and said mounting hub; whereby said clamp is operative to secure said skirt board against said mounting surface to permit movement of said skirt board toward said conveyor belt but to retard movement of said skirt board away from said belt.

10. A clamp as in claim 9 formed of generally triangular shape including a pair of legs connecting said clamping bar and said mounting hub said legs diverging outwardly from said mounting hub and extending to said clamping bar.

11. A clamp as in claim 9 formed of resilient material so as to permit flexure of said leg and said clamping bar.

12. A clamp as in claim 11 in which said resilient material comprises fiberglass.

13. A clamp as in claim 9 including securement means formed on said clamp adapted for securement of adjacent clamps together so as to prevent twisting.

14. A clamp as in claim 13 in which said securement means includes at least one boss disposed on said clamping bar said boss defining an aperture therethrough.

* * * * *